Patented Sept. 18, 1945

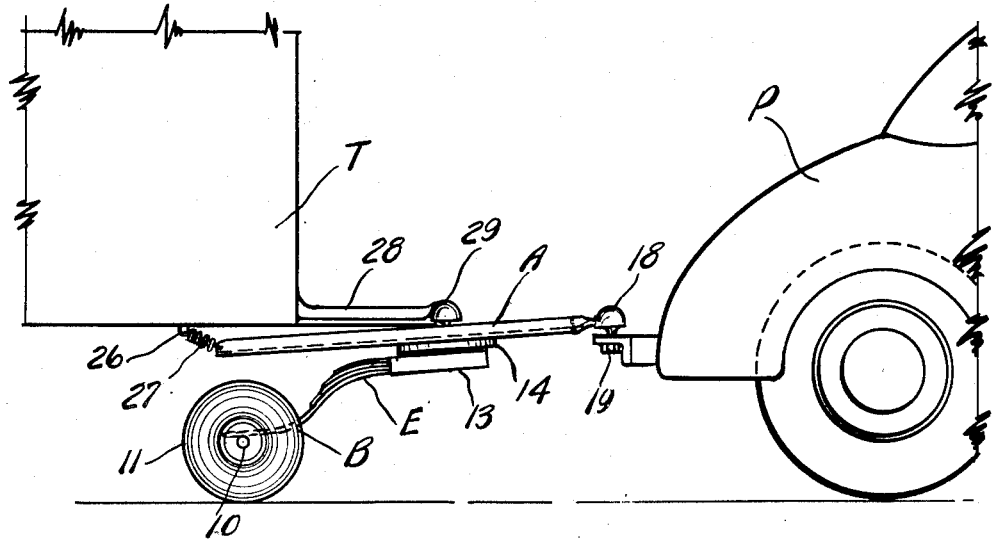
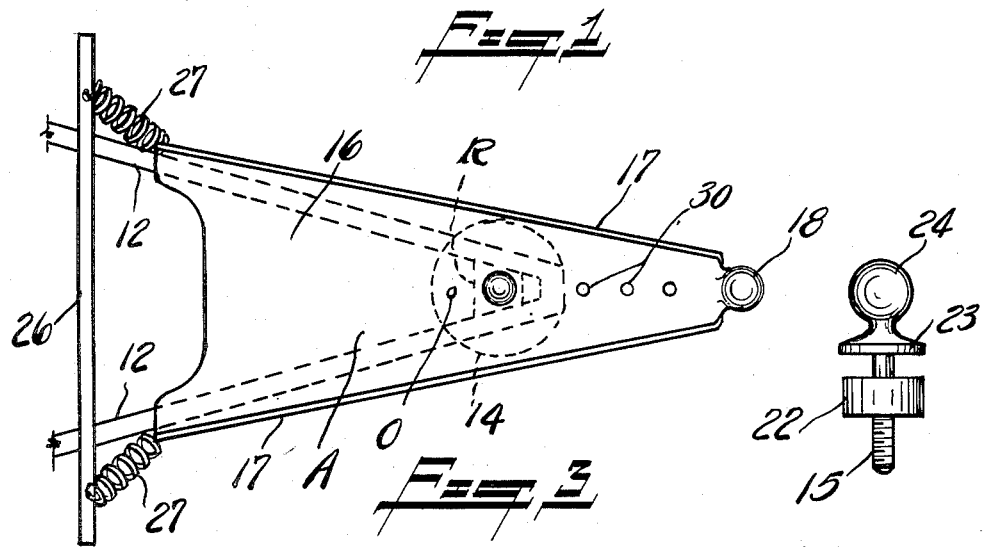
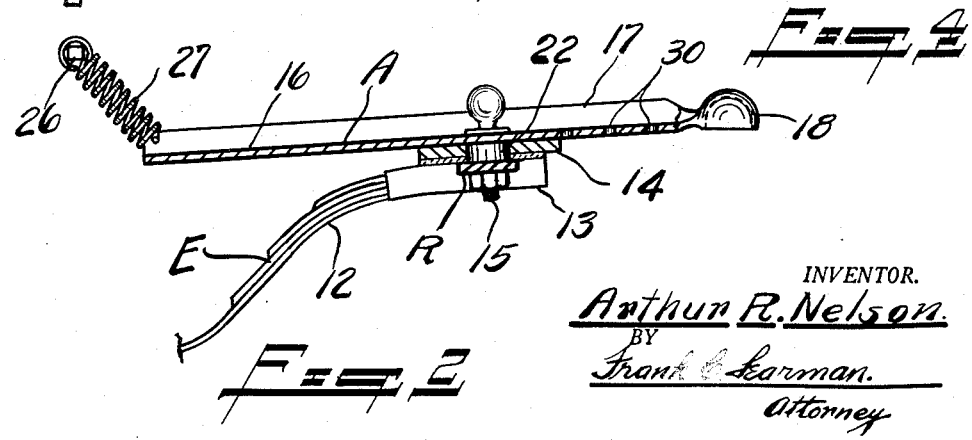
INVENTOR.
Arthur R. Nelson.
BY Frank C. Karman.
Attorney Sept. 18, 1945.  A. R. NELSON  2,385,099
MEANS FOR COUPLING A TRAILER AND BOGIE TO A PRIME MOVER
Filed July 25, 1944  2 Sheets-Sheet 2
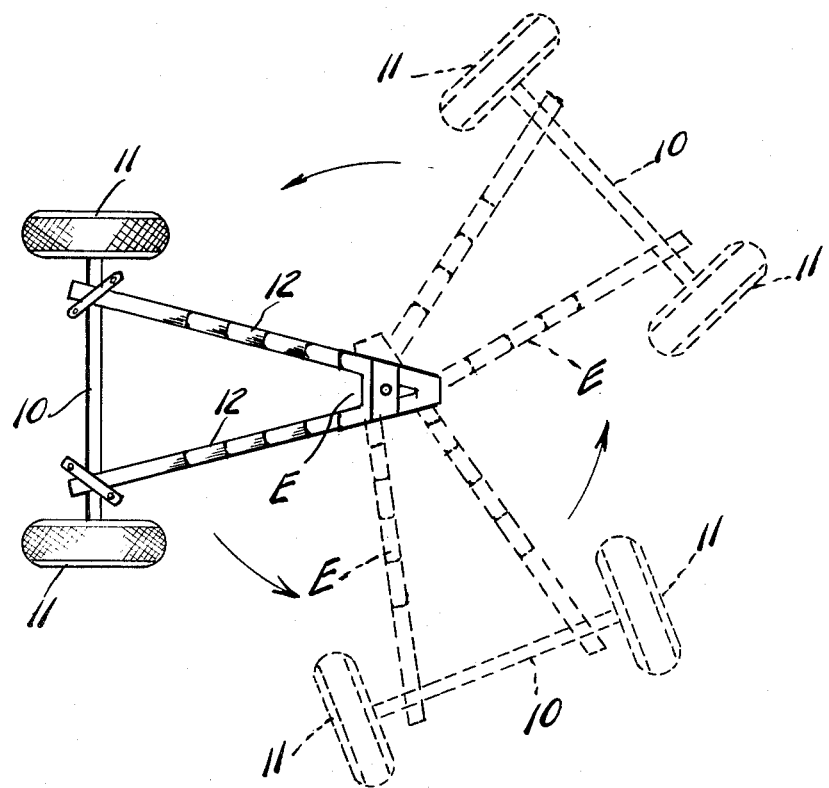
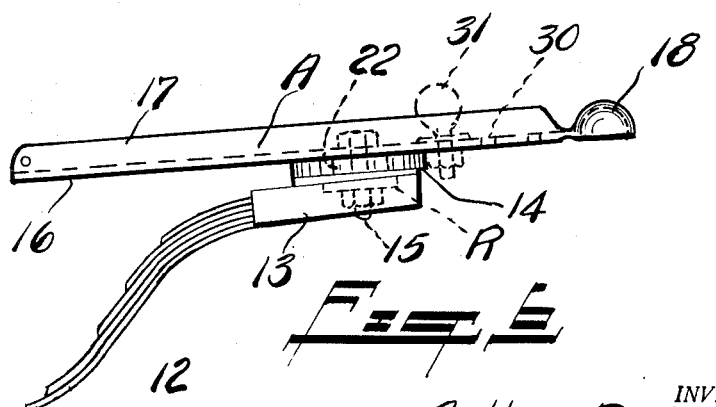
INVENTOR.
Arthur R. Nelson.
BY Frank C. Fearman.
Attorney.

2,385,099

UNITED STATES PATENT OFFICE 2,385,099

MEANS FOR COUPLING TRAILERS AND BOGIES TO PRIME MOVERS

Arthur R. Nelson, Bay City, Mich.

Application July 25, 1944, Serial No. 546,509

9 Claims. (Cl. 280—33.4)

This invention relates to a bogie attachment for supporting the front end of a house trailer or similar vehicle and by means of which the trailer may be readily coupled, in the usual manner, to a power vehicle, or accurately backed into a parking space, driveway, or building without detaching or excessive maneuvering at present necessary to accomplish such result.

One of the prime objects of the invention is to provide a very simple, substantial, and inexpensive attachment for connecting the trailer to a bogie, and the bogie to the power vehicle, and by means of which the trailer may be easily and accurately backed without skidding, cramping, or sliding of the tires.

Another object is to provide an attachment which can be readily applied to bogies at present in general use as well as to those in the process of manufacture.

A further object is to provide an attachment mounted on a trailer bogie and so connected and arranged that any predetermined portion of the weight of the forward end of the trailer is carried by the bogie, and so that it may travel over rough, uneven roadways without binding or otherwise causing tortional twists or strains to the bogie or attachment.

The above and other objects will appear as the specification progresses, reference being had to the accompanying drawings in which I have shown the preferred embodiment of my invention, and in which like references indicate like parts through the several views thereof.

In the drawings:

Fig. 1 is a fragmentary, side elevational view showing a trailer, bogie and power vehicle connected together in accordance with my invention.

Fig. 2 is an enlarged, sectional, side elevational view of the attachment showing also the bogie tongue and ball bolts.

Fig. 3 is a top plan view.

Fig. 4 is an enlarged, sectional detail showing the kingpin assembly.

Fig. 5 is a diagrammatic plan view illustrating the castering or swinging of the bogie around the kingpin.

Fig. 6 is a view similar to Fig. 2 showing the trailer tongue connection ahead of the bogie tongue connection.

Referring now to the drawings in which I have shown the preferred embodiment of my invention, the letter T indicates a house trailer of conventional design, the front end of which is partially supported on a bogie B which is in turn connected to a prime mover or power vehicle P.

The bogie is of general design such as shown in Letters Patent 2,309,204 issued to me January 26, 1943, and comprises an axle 10 supported on ground engaging wheels 11, and a tongue E is connected to said axle, this tongue comprising spaced apart resilient members 12, the front ends of which converge and are secured together by means of a frame 13. A circular plate 14 is welded or otherwise rigidly secured to the frame 13, and a kingpin 15 extends therethrough.

The attachment A can be of any desired shape, and in the present instance comprises an elongated frame 16 having side reinforcing flanges 17 on the edges thereof, the forward end terminating in a ball socket 18 adapted to be connected to a ball bolt 19 provided on the power vehicle P in the usual manner. The plate 14 is centrally bored as at 21 to accommodate a bearing 22 through which the kingpin 15 extends, said pin being formed with a flange 23 bearing on and secured to the face of the attachment, the upper end terminating in a ball member 24, and for a purpose to be presently described, the lower end of the kingpin extending through the transversely disposed bar R which forms a part of the frame 13 and is threaded to receive a nut 25 as usual.

The rear end of the attachment frame 16 normally extends beneath the trailer body so that mud and debris thrown by the bogie wheels 11 will strike the trailer body and will not be thrown onto the power vehicle.

The front end of the attachment frame is universally connected to the power vehicle as above described, while the rear end is flexibly supported, a transversely disposed bar 26 being provided on the trailer, and springs 27 are connected to the ends of said bar and to the flanges 17, thus yieldably supporting the rear end of said frame, this flexible mounting together with the action of the resilient members 12 which form the bogie tongue, providing the flexibility necessary when the vehicles travel over rough and uneven roads, or when one wheel drops into a rut or hole, the bearing 22 providing for easy rotational movement and eliminating tortional twists and strains. A lubricant opening O or suitable grease fitting (not shown) can be provided on the plate 16 to admit lubricant to the upper face of the plate 14.

A forwardly projecting draw bar 28 is provided on the trailer T, said draw bar terminating in a ball socket 29 for connection to the ball bolt 24 in the usual manner, thus universally connecting the trailer to the attachment frame, or the trailer can be connected directly to the power vehicle if desired.

The bearing 22 can be inserted in any desired manner, it can be either a ball or a roller bearing, and I do not deem it necessary to describe this in detail as it can be of the conventional type at present in general use.

A plurality of spaced apart opening 30 are provided in the attachment frame between the trailer and power vehicle connections, so that the point of connection of the trailer tongue to the attachment can be varied, this necessitates an additional ball bolt 31, as indicated in Fig. 6, and when it is desired to impose more of the weight of the forward end of the trailer on the power vehicle, the ball bolt is shifted forwardly, and it will be obvious that the trailer weight carried by the bogie and the power vehicle respectively can be equalized or proportioned by merely shifting the point of connection of the trailer tongue to the attachment.

To back a vehicle with trailer attached or connected by means of a ball and socket connection is a difficult operation, the wheels cramp and skid, and a great deal of maneuvering is necessary, even by a skilled and experienced operator, and this problem has been greatly simplified by my combination bogie and frame attachment by means of which the trailer can be easily backed into parking lots, buildings, around curves, or to make reasonable degree of turn desired.

I wish to direct particular attention to the fact that the bogie is free to swing around the kingpin 15 with a full castering movement and as clearly indicated in Fig. 5 of the drawings, this movement being occasioned when backing up, the wheels 11 being sufficiently low to clear the trailer body and the fenders of the power vehicle.

The attachment frame and general hook-up is simple, practical, and comparatively inexpensive, it can be furnished as a complete unit at the factory, or can be added to bogies at present in general use, it permits of close coupling, eliminates any tendency of the bogie and trailer to shimmy, and is easy to assemble and attach.

The herein described construction and arrangement admits of considerable modification without departing from the invention; I therefore do not wish to be limited to the precise arrangement shown and described, which is broadly for the purpose of illustration, as the scope of protection is to be taken solely from the appended claims interpreted as broadly as is consistent with the prior art.

What I claim is:

1. A coupling attachment for connecting a trailer to a prime mover comprising a frame having a ball bolt socket on one end thereof for connection to the prime mover, a bogie, a resilient tongue on said bogie, with its outer end revolvably connected to said frame, means for universally connecting said trailer to said frame, and means for resiliently connecting the coupling attachment to said trailer.

2. A coupling apparatus for connecting a trailer to a power vehicle and including an attachment frame having a universal connection at the forwrd end thereof for connection to the power vehicle, a bogie, a tongue on the bogie and rotatably connected to the attachment at a point spaced rearwardly from the universal connection, said bogie having full castering movement about said tongue connection, a ball bolt on the frame and to which the trailer is universally connected, and means for flexibly supporting the rear end of said frame.

3. A construction as defined in claim 2 in which a transversely disposed rod is provided on the trailer, and springs connected to the rod and attachment frame respectively.

4. A construction as defined in claim 2 in which the bogie tongue is resilient.

5. The combination as specified in claim 2 in which the point of connection of the trailer to the frame is shiftable to vary the weight imposed on the power vehicle.

6. A coupling apparatus for connecting a bogie and a trailer to a prime mover comprising, a coupling attachment having a ball socket on the forward end thereof for attachment to the prime mover, a bearing mounted on said attachment and to which the bogie tongue is connected to permit free castering movement of the bogie around said bearing, a plurality of spaced apart ball bolt openings in said attachment, and a ball connection mounted in a selected opening and to which the trailer tongue is universally connected.

7. A coupling apparatus for connecting a bogie and a trailer to a prime mover comprising, an attachment frame with its front end terminating in a ball socket for connection to the prime mover, a bearing in said frame at a point spaced rearwardly from the ball socket and to which the bogie tongue is connected, a ball bolt on the face of the attachment and to which the trailer tongue is connected, means for yieldably supporting the rear end of the attachment comprising, a bar mounted on the trailer, and springs anchored to the bar and to the sides of the attachment for yieldably supporting it in position.

8. A coupling member for connecting a bogie and a trailer tongue to a prime mover, said member having its front end universally connected to a prime mover with its rear end yieldably connected to said trailer, means for revolvably connecting the bogie tongue to said member at a point intermediate the front and rear connection, and means for universally connecting said trailer tongue to said member in substantially vertical alignment with said revolvable connection.

9. A construction as defined in claim 8 in which the revolvable means is associated with the means for universally connecting the trailer tongue to the coupling member.

ARTHUR R. NELSON.